United States Patent
Mermelstein et al.

(10) Patent No.: US 7,733,561 B2
(45) Date of Patent: Jun. 8, 2010

(54) SUPPRESSION OF STIMULATED BRILLOUIN SCATTERING (SBS) IN HIGH POWER FIBER AMPLIFIERS

(75) Inventors: Marc Mermelstein, Highland Park, NJ (US); Andrew D. Yablon, Livingston, NJ (US)

(73) Assignee: OFS Fitel. LLC, Norcross, GA (US)

( * ) Notice: Subject to any disclaimer, the term of this patent is extended or adjusted under 35 U.S.C. 154(b) by 865 days.

(21) Appl. No.: 11/169,998

(22) Filed: Jun. 28, 2005

(65) Prior Publication Data

US 2007/0019283 A1 Jan. 25, 2007

(51) Int. Cl.
*H04B 10/17* (2006.01)
*G02B 6/00* (2006.01)

(52) U.S. Cl. ......................................... 359/337; 385/95
(58) Field of Classification Search ................. 359/337; 385/95
See application file for complete search history.

(56) References Cited

U.S. PATENT DOCUMENTS

| | | | | |
|---|---|---|---|---|
| 4,159,178 | A * | 6/1979 | Vali et al. | 356/461 |
| 6,323,993 | B1 * | 11/2001 | Hansen et al. | 359/337 |
| 6,347,174 | B1 * | 2/2002 | Onishi et al. | 385/122 |
| 6,459,479 | B1 * | 10/2002 | Lee et al. | 356/73.1 |
| 6,535,315 | B1 | 3/2003 | Way et al. | |
| 6,606,190 | B2 | 8/2003 | Lee et al. | |
| 6,678,294 | B1 | 1/2004 | Komine et al. | |
| 7,120,339 | B2 * | 10/2006 | Varnham et al. | 385/123 |
| 2004/0184815 | A1 * | 9/2004 | Korolev et al. | 398/148 |
| 2004/0218882 | A1 | 11/2004 | Bickham et al. | |
| 2004/0247320 | A1 * | 12/2004 | Bickham et al. | 398/71 |

FOREIGN PATENT DOCUMENTS

WO WO 2004/030165 A1 * 8/2004

OTHER PUBLICATIONS

Hansryd et al. "Increase of the SBS Threshold in a Short Highly Nonlinear Fiber by Applying a Temperature Distribution", Journal of Lightwave Technology, vol. 19, No. 11, pp. 1691-1697, (Nov. 2001).*
www.merriam-webster.com/dictionary/gradient, accessed on Feb. 6, 2009.*

* cited by examiner

*Primary Examiner*—Eric Bolda

(57) ABSTRACT

A fiber amplifier suitable for high power, narrow linewidth applications exhibits suppression of stimulated Brillouin scattering (SBS) by segmenting the fiber amplifier into separate portions that exhibit different Brillouin center frequencies. By changing the center frequencies in adjoining segments of the fiber amplifier, the backward-propagating Stokes signal is essentially blocked, and SBS is suppressed. In a preferred embodiment the segmentation is added to the terminating portion of the fiber amplifier. Various techniques, including temperature modifications, can be used to impart the desired center frequency shift.

14 Claims, 3 Drawing Sheets

SUPPRESSION OF STIMULATED BRILLOUIN SCATTERING (SBS) IN HIGH POWER FIBER AMPLIFIERS

TECHNICAL FIELD

The present invention relates to high power, narrow linewidth fiber amplifiers and, more particularly, to a segmented, gain-shifted arrangement for suppressing the presence of stimulated Brillouin scattering (SBS) in high power fiber amplifiers.

BACKGROUND OF THE INVENTION

High power, narrow linewidth laser radiation is frequently generated in a master oscillator power amplifier (MOPA) configuration that utilizes a low power, single frequency seed laser, followed by a high power fiber amplifier. These sources are currently under development for a variety of applications, such as free-space optical communications (FSOC), range finding, spectroscopy and interferometry. The maximum achievable power in a conventional fiber amplifier is typically limited by the onset of stimulated Brillouin scattering (SBS). SBS is an inherent effect that occurs in fiber amplifiers in which the forward-propagating power in the amplifier is converted into backward propagating power with a slightly downward frequency shift that limits the power transfer through a fiber amplifier. SBS gain is dependent on beam intensity, spectral width, and fiber length, generating both forward and backward propagating acoustic phonons at the Brillouin shift frequency, defined as:

$$\nu_B = 2 \cdot V_S \cdot n / \lambda_0,$$

where n is the approximate refractive index of the fiber core, $\lambda_0$ the laser wavelength in a vacuum and $V_S$ is the approximate speed of sound in the fiber core. It should be recognized that SBS does not generally occur at low powers and for short lengths of optical fiber over which a signal is transmitted.

In high power fibers, there is a desire for relatively small modal diameters (on the order of approximately 6 µm for single mode fibers and 25 µm for multimode fibers), source linewidths less that the SBS gain-bandwidth (approximately 50 MHz) and relatively long fiber lengths (on the order of 10 m). The presence of SBS in high power, narrow linewidth lasers causes several problems: (1) it limits the maximum output power of the amplifier; (2) the reflected power experiences further amplification by the ion inversion in the gain fiber, thus generating "giant" pulses with very high peak powers that can damage the optical fiber, and (3) the reflected optical power can undergo secondary reflections so that extraneous pulses can appear on the fiber amplifier output, corrupting temporal and spectral characteristics of the output pulse.

Thus, a need remains in the art for an arrangement that mitigates the presence of SBS in high power, narrow linewidth fiber amplifiers.

SUMMARY OF THE INVENTION

The need remaining in the prior art is addressed by the present invention, which relates to high power, narrow linewidth fiber amplifiers and, more particularly, to a segmented, gain-shifted arrangement for suppressing the presence of SBS in high power fiber amplifiers.

In accordance with the present invention, a fiber amplifier is "segmented" (divided) into regions with differing Brillouin frequencies so that the central frequency of the Brillouin gain curves in adjacent segments is different. The appearance of different center frequencies will prevent the continual Brillouin amplification of backward-propagating pulses through the fiber amplifier segments.

There are various techniques that may be used in accordance with the present invention to modify the center frequency of the Brillouin gain curve, including heating the segments to different temperatures, altering the core composition of each segment, imparting a physical strain on different segments of the fiber amplifier, altering the fiber modal properties of each segment, etc.

In a preferred embodiment of the present invention, each contiguous segment exhibits a shift in center frequency of the Brillouin gain curve by an amount at least equal to the Brillouin gain bandwidth (on the order of, for example, 50 MHz).

Other and further embodiments and aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
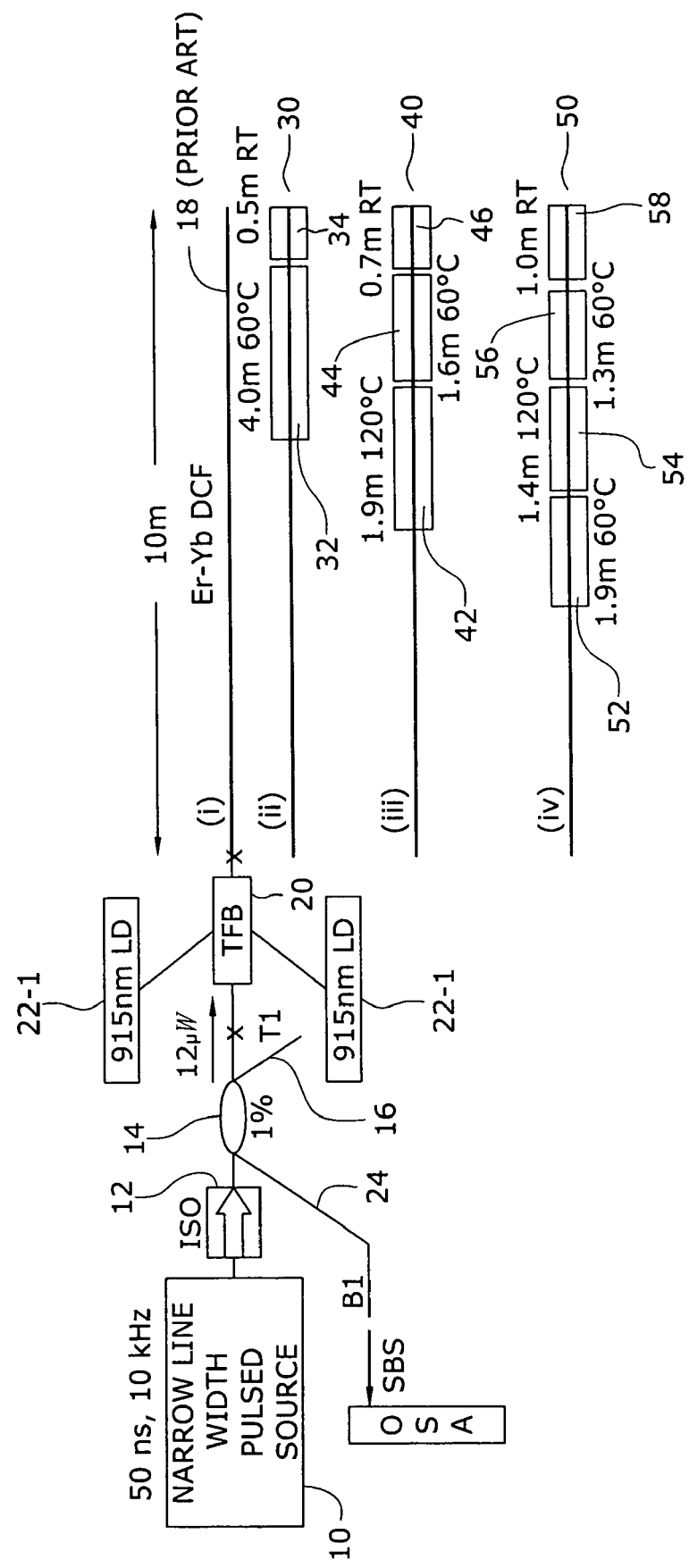
FIG. 1 illustrates several different embodiments of the present invention, as well as a prior art "single segment" fiber amplifier, the different embodiments of the present invention utilizing different numbers of separate, Brillouin gain-shifted fiber amplifier segments.

Stimulated Brillouin scattering (SBS) is known to occur when backward-propagating Stokes radiation (generated by thermal Brillouin scattering in an optical amplifier) mixes with the high intensity forward-propagating signal laser radiation by means of the electrostrictive effect. This nonlinear interaction generates forward- and backward-propagating acoustic phonons at the Brillouin shift frequency, defined as follows:

$$\nu_B = 2 \cdot V_S \cdot n / \lambda_0,$$

where n is the approximate refractive index of the core of the optical waveguide (e.g., fiber core), $\lambda_0$ is the propagating signal wavelength (as measured in a vacuum), and $V_S$ is the approximate sound speed in the core of the optical waveguide. In one exemplary arrangement, for a typical $\lambda_0$ of 1545 nm, n of 1.48, and $V_S$ of 5960 m/s, the calculated Brillouin shift is approximately 11.4 GHz (or 91 pm).

Generation of forward-propagating acoustic phonons enhances the Stokes backscattering, thereby providing gain to the Stokes radiation and generating SBS. The Brillouin gain curve is centered at the Stokes optical frequency $v_0-v_B$, where $v_0$ is the signal optical frequency ($v_0=c/\lambda_0$, c being defined as the speed of light in a vacuum). The gain spectrum has a full-width at half-maximum (FWHM) given by the gain bandwidth $\Delta v_B$, which typically lies between 25 and 50 MHz.

Suppression of SBS in a fiber amplifier in accordance with the present invention has two added complexities as a result of the population inversion. First, the signal will increase along the length of the fiber amplifier, and is generally at a maximum at the output so that the SBS will most likely be generated at the output of the fiber amplifier. Further, the backward-propagating Stokes radiation, once generated, will itself be amplified by the gain medium within the fiber core. In accordance with one embodiment of the present invention, SBS generation is minimized along the output portion of the fiber by applying the segmentation technique to the terminating end portion. This changes the local sound velocity and Brillouin shift so that Stokes radiation generated in one segment does not receive additional Brillouin gain from the previous segments. It is expected that the segment lengths will be shorter near the output end of the amplifier where the signal power is greater and the SBS threshold length is smaller.

The Brillouin shift, and therefore its associated gain center frequency, exhibits temperature dependence as a result of the change in the sound velocity ($V_S$) with temperature. This frequency shift has been found to be approximately 1.2 MHz/° C. at the conventional propagating optical signal wavelength of 1545 nm. In accordance with one embodiment of the present invention, therefore, segmentation of the fiber into a plurality of separate temperature zones that differ by the temperature-equivalent gain-bandwidth (approximately 42° C. for the desired $\Delta v_B$ of about 50 MHz) will frustrate the continual Brillouin amplification of the backward-propagating Stokes radiation over the entire length of the fiber amplifier.

FIG. 1 illustrates an exemplary arrangement for studying and understanding the effects of fiber amplifier segmentation on reducing SBS in accordance with the present invention. A narrow linewidth pulsed laser source 10 is used to provide a high power, narrow linewidth signal that can be studied as it propagates through an exemplary segmented fiber amplifier of the present invention. In the particular arrangement as shown in FIG. 1, source 10 exhibits a laser wavelength of 1545 nm, with a linewidth of 250 kHz. Source 10 was operated at a pulse width of approximately 50 ns, with a repetition frequency of 10 kHz, providing a duty cycle of $5 \cdot 10^{-4}$. Referring to FIG. 1, the output pulses from source 10 are then passed through an optical isolator 12 and coupled into an optical coupler 14. Optical coupler 14 (which, for experimental purposes may be a 1% tap) functions to provide a relatively small amount of the signal along a tap-off port 16 so that the forward-propagating signal may be monitored. The majority of the signal, however, is subsequently injected into a fiber amplifier 18 through a tapered fiber bundle (TFB) 20. One or more pump laser sources 22 are also coupled to TFB 20, and used to provide the amplifying signals to fiber amplifier 18. In the particular arrangement as illustrated in FIG. 1, a pair of 915 nm pump laser sources 22-1 and 22-2 are used to supply the pump signal input.

In an exemplary prior art fiber amplifier, an Er—Yb co-doped, double cladding fiber may be employed, having a core mode field diameter of 6.34 μm, a core numerical aperture (NA) of 0.19, a cladding diameter of 130 μm and a conventional low-index outer coating. For the purposes of understanding the improvement in SBS suppression associated with the present invention, the presence of SBS along prior art fiber amplifier 18 (maintained at room temperature) is first analyzed. Initial experiments were conducted at room temperature using a fiber amplifier having a length of 10 meters. The power of pump sources 22 was increased, and the amplifier average output power was measured, and the backward-propagating Stokes radiation exiting port 24 of coupler 14 was monitored with an optical spectrum analyzer (OSA) 26.

Figure 2:
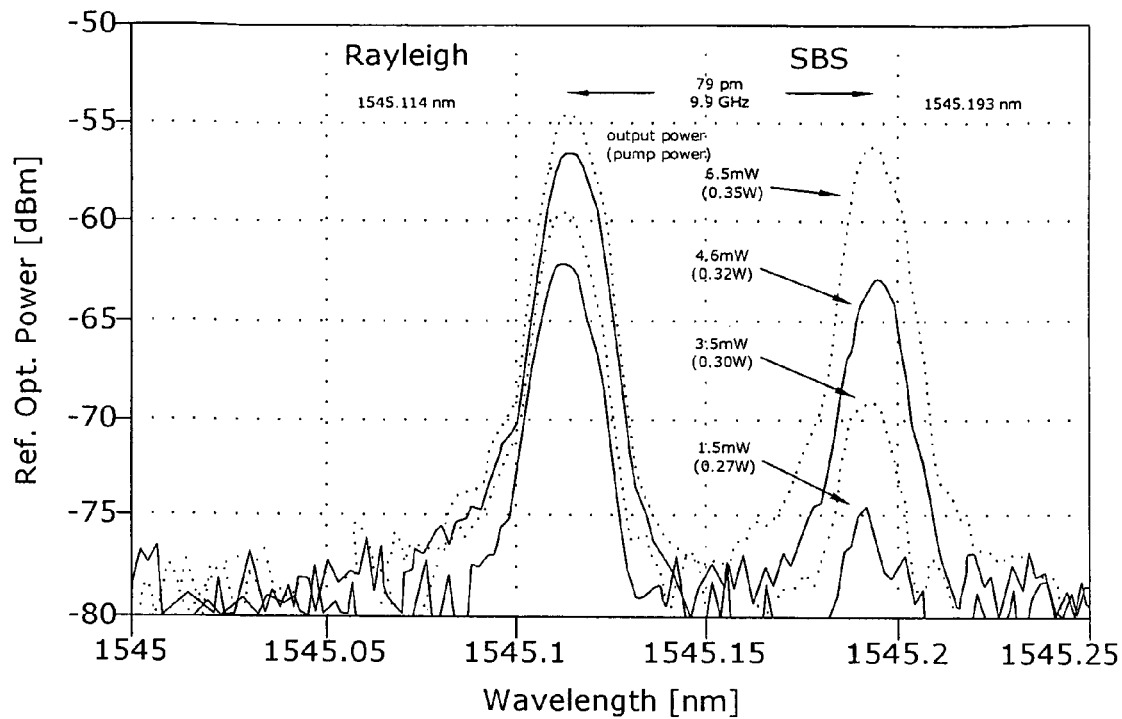
FIG. 2 contains a graph of prior art backscatter radiation as a function of pump power, illustrating the backward-propagating Rayleigh and Stokes radiation.

FIG. 2 illustrates the high resolution (10 pm) prior art optical spectrum backscatter radiation as the pump power is increased in the prior art arrangement as described above. Shown in particular are the backward-propagating Rayleigh and Stokes radiation appearing at port 24 of coupler 14. In particular, a Rayleigh component of the spectrum is visible at the laser wavelength of 1545 nm. This component can be attributed to Raleigh light scattering in prior art fiber amplifier 18, and subsequent amplification by population inversion. A small Stokes component for an average output power of approximately 1.5 mW is evident at the Brillouin shift of 79 pm, corresponding to a frequency shift of 9.1 GHz—which is considered to be in reasonable agreement with the calculated shift of 11.4 GHz. As shown, the Stokes peak exhibits a more rapid growth than the Rayleigh peak as the pump power and amplifier output power are increased. Further increases in output power were found to generate multiple Stokes components.

In accordance with the present invention, therefore, fiber amplifier segmentation may be employed to shift the center wavelength of the Brillouin gain curves and reduce the presence of SBS in fiber amplifiers. Referring back to FIG. 1, several illustrative segmented fiber amplifiers are shown. It is to be understood that these variations are exemplary only and that numerous other arrangements may be used. Moreover, other means of inducing a center frequency shift (as described above) may be used in place of imparting a temperature difference to the adjoining segments. A first segmented fiber amplifier 30 formed in accordance with the present invention comprises a first segment 32 maintained at a temperature of, for example, 60° C., and a second segment 34 maintained at room temperature. As shown, second segment 34 is a relatively short segment and disposed at the termination of fiber amplifier 30, with first segment 32 disposed contiguous with second segment 34.

In the particular arrangement of FIG. 1, fiber amplifier 30 maintains an overall length of 10.0 m, with first segment 32 (maintained at 60° C.) having a length of 4.0 m and second segment 34 (maintained at room temperature) having a length of 0.5 m. Another segmented fiber amplifier 40 is shown as comprising three separate segments: a first segment 42 maintained at a temperature of approximately 120° C., a second segment 44 maintained at a temperature of 60° C., and a third segment 46 maintained at room temperature. As shown in FIG. 1, segmented fiber amplifier 40 also exhibits an overall length of 10 m, with first segment 42 having a length of about 1.9 m, second segment 44 having a length of about 1.6 m, and third segment 46 having a length of about 0.7 m. A discussion on optimizing the parameters of the various segments is included hereinbelow in association with the description of FIG. 5.

A third segmented optical fiber amplifier 50 is also shown in FIG. 1, where segmented fiber amplifier 50 comprises a set of four different segments that are appended to an end portion of a conventional fiber amplifier. In this case, a first segment 52 is maintained at a temperature of 60° C., a second segment 54 is maintained at a temperature of 120° C., a third segment is maintained at a temperature of 90° C., and a fourth segment 58 is maintained at room temperature. In the exemplary embodiment where the overall length of segmented fiber amplifier 50 is maintained at 10 m, first segment 52 is shown as having a length of 1.9 m, second segment 54 has a length of 1.4 m, third segment 56 has a length of 1.3 m, and fourth segment 58 has a length of 1.0 m. In each case, the various temperature-defined segments can be formed by winding a conventional fiber amplifier on a spool (for example, a 3-4 inch diameter aluminum spool) and then placing the spool on a temperature-controlled support element. As mentioned above, it is preferred to locate these frequency-shifted segments at the terminal portion of the fiber amplifier, where the Stokes components are largest in value. However, it is to be understood that in general the segmentation may be disposed at any locations along the length of the fiber amplifier.

Figure 3:
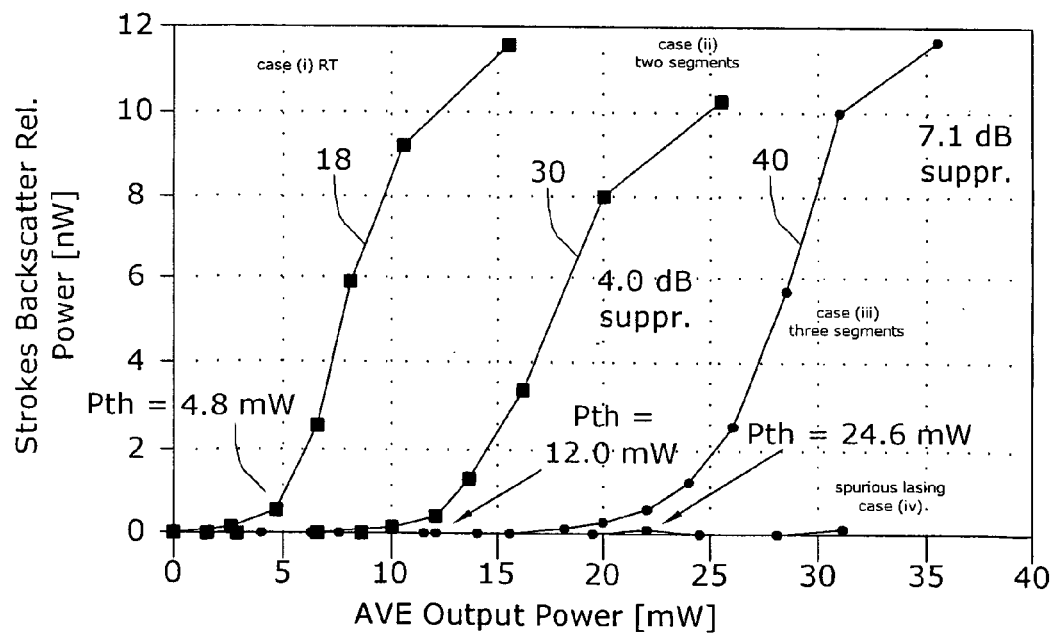
FIG. 3 contains various plots of Stokes backscatter power as a function of the average output power for the various embodiments of the present invention as illustrated in FIG. 1.

FIG. 3 contains a graph that plots the relative optical power in the Stokes component as a function of the amplifier average output power for a conventional prior art fiber amplifier, as well as for each of the particular segmented fiber amplifiers of the present invention as illustrated in FIG. 1. In each case, the Stokes growth was first measured at room temperature and then measured with the specific temperature segmentation arrangement. Threshold levels can be estimated by linear extrapolation of the Stokes data to the output power axis. For these particular embodiments, the threshold at room temperature is shown to be approximately 4.8 mW, increasing to 12.0 mW for the two-segment arrangement of fiber amplifier 30 and 24.6 mW for the three-segment arrangement of fiber amplifier 40. As shown in FIG. 3, the utilization of four separate temperature segments in fiber amplifier 50 frustrates the appearance of the Stokes backscatter signal. Instead, the amplifier exhibits spurious lasing at 25 mW of output power as a result of the low injection power and high amplifier gain.

Figure 4:
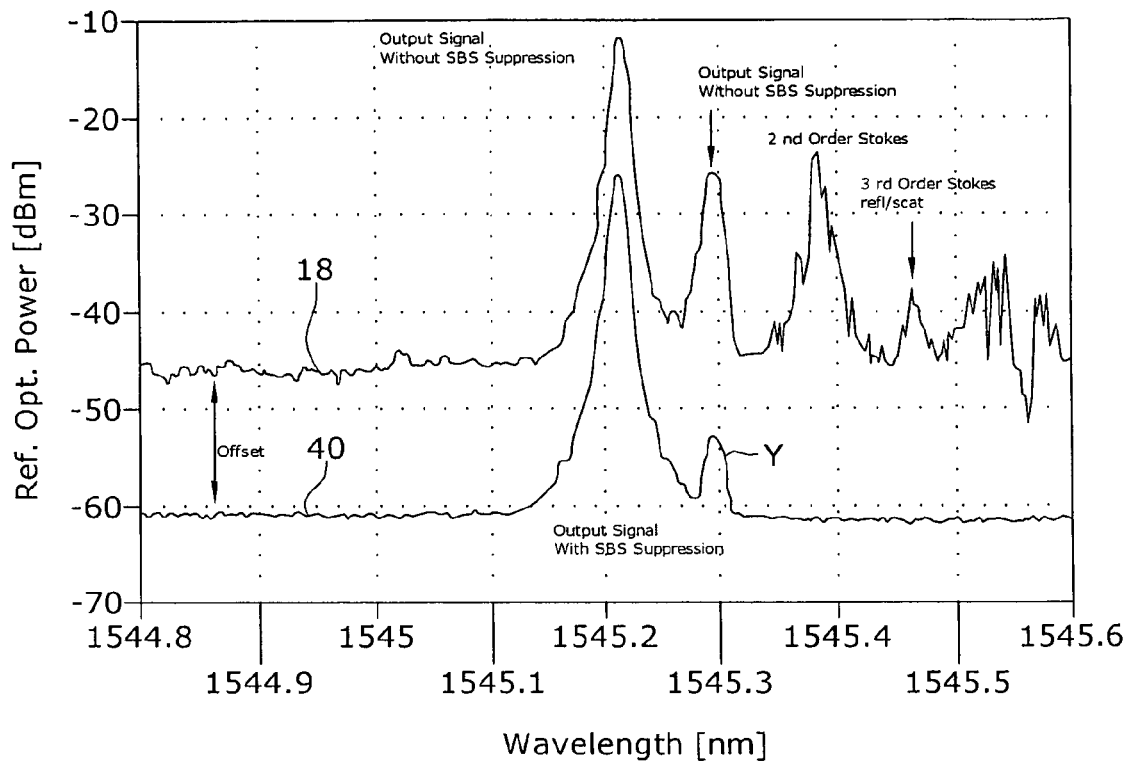
FIG. 4 is a graph containing a first plot of the amplifier output spectra for a prior art fiber amplifier arrangement, and a second plot of the output spectra for a segmented fiber amplifier formed in accordance with the present invention.

The optical spectra for prior art fiber amplifier 18 and three-segment inventive fiber amplifier 40 are illustrated in FIG. 4 for an average output power of approximately 22 mW (the plots being offset from one another for the sake of clarity). As shown, a number of separate Stokes orders are evident in the spectrum of the prior art arrangement, similar to known multiple-Stokes scattering effects. The lower trace illustrates the optical spectrum for three-segment fiber amplifier 40, with 7.1 dB of SBS suppression. The pump power was measured to be 0.54 mW, with an optical signal-to-noise ratio of approximately 35 dB. A relatively small remnant of the Stokes light is present (labeled as point "A" in the graph), at a level of approximately 27 dB from the signal power. It is clear that the utilization of temperature segmentation of the fiber amplifier, in accordance with the present invention, is capable of significantly reducing/eliminating the unwanted SBS.

Although the particular examples as discussed hereinabove utilized temperature control to provide the desired shift of the Brillouin center frequency, other techniques may be employed. For example, it is possible to alter the composition of the fiber core region to shift the center frequency. In particular, variations in the core dopant concentrations of F and $GeO_2$ have been shown to introduce a shift in the Brillouin gain spectra of approximately 277 MHz/wt % and 45 MHz/wt %, respectively. Alternatively, a physical strain may be imposed on the fiber, affecting the effective refractive index and birefringent effects. For example, a strain on the order of $10^{-3}$ will generate an SBS shift of approximately 50 MHz. Further, it has been found that altering the modal properties of a fiber by varying the core radius as a function of position along the extent of the fiber amplifier will change the local sound speed, and thus introduce a local shift in the Brillouin gain spectra. This modal alteration technique may also be used in accordance with the present invention to mitigate the onset of SBS in a segmented fiber amplifier in accordance with the present invention.

Figure 5:
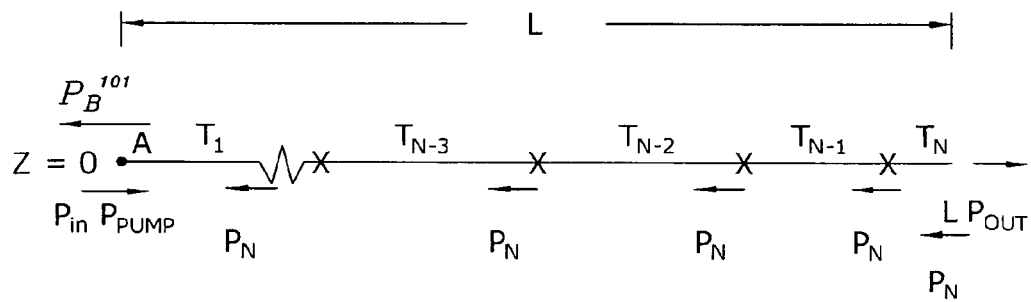
FIG. 5 is a simplified model of a particular technique for optimizing the segmentation architecture in accordance with the present invention.

As mentioned above, it is desirable to identify the optimal segmentation arrangement of a fiber amplifier that will maximize SBS suppression in accordance with the present invention. FIG. 5 illustrates one particular model that may be used to identify "break points", indicated by the "x's" in FIG. 5, for each segment. It is presumed that an exemplar fiber amplifier 100 comprises an overall length L. An optical input signal with an initial power of $P_{in}$ is injected into fiber amplifier 100 at an input point A, at position z=0 along length L. Gain is achieved, as is known in the art, by achieving a population inversion in the rare earth ions by pumping the inner cladding with a pump laser at a specific wavelength.

Referring to FIG. 5, fiber 100 is shown as being divided into N segments as determined by the dimensionless breakpoints $\alpha_i = z_i/L$, where $i=1, 2, \ldots, N-1$. Each segment is held at a predetermined temperature $T_j$, where $j=1, 2, \ldots, N$ and where neighboring segments have a temperature difference $\Delta T = |T_j - T_{j-1}|$ greater than the temperature-equivalent gain-bandwidth. In this manner, backward-propagating Stokes radiation (as amplified in section j) will not be subjected to further Brillouin gain in the preceding (j−1) segments.

It is desirable to determined the specific breakpoints $\alpha_i$ that will minimize the total Stokes backscattered power. This can be accomplished by viewing each temperature segment as an independent fiber Brillouin amplifier. Therefore, the input at the distal end of the $j^{th}$ segment will be the noise-equivalent thermal Brillouin power $P_N$. The amplification medium is accounted for by assuming a linear increase in the signal optical power as it travels along length L of fiber 100. Thus, the backward-propagating SBS power can be determined by the following equations:

$$P_s(z) = P_{in} + \left(\frac{P_{out} - P_{in}}{L}\right) \cdot z,$$

and $$\frac{dP_B(z)}{dz} = \frac{g_B}{A} \cdot P_B(z) \cdot P_s(z)$$

where the top equation describes the linear growth of the signal power in the gain medium from an input power $P_{in}$ to an output power $P_{out}$ and the bottom equation describes the Brillouin amplification in each fiber segment with an input power $P_N$, where $g_B$ is the Brillouin gain, A is the modal area (intrinsic fiber loss being neglected for the sake of simplicity).

The total backward-propagating Stokes power can thus be obtained by substituting the top equation in the bottom one, then integrating for each segment with the amplifier input boundary condition of $P_N$ at the distal end of each segment, and summing for all segments. This yields the following expression for the total backward-propagating Stokes power exiting the fiber at input power z=0:

$$P_B^{tot}(0) = P_N \cdot \left\{ e^{\beta \cdot \alpha_1^2} + \sum_{j=1}^{N} e^{\beta(\alpha_{j+1}^2 - \alpha_j^2)} + e^{\beta(1-\alpha_N^2)} \right\},$$

where $\beta = 0.5 \cdot g_B \cdot P_{out} \cdot L/A$ and it is assumed that $P_{in} \ll P_{out}$. Application of a minimization routine to the above equation shows that the total Stokes radiation is minimized at breakpoints given by:

$$\alpha_i = \sqrt{\frac{i}{N}}.$$

Applying this factor to the various embodiments of the present invention as illustrated in FIG. 1 thus yields the following results: $\alpha_i=\{0.707\}$ for two-segment fiber amplifier 30, $\alpha_i=\{0.577, 0.816\}$ for three-segment fiber amplifier 40, and $\alpha_i=\{0.500, 0.707, 0.866\}$ for four-segment fiber amplifier 50, and so on. The use of this breakpoint factor provides guidance for designing the optimal temperature distribution for the inventive fiber amplifier. It is to be noted that the breakpoints can be modified for signal profiles other than that defined by the first equation. In its most general sense, the general design rule of the present invention is that the segments must become shorter at the output end of the amplifier where the signal is greater in order to minimize the SBS.

Although the present invention has been particularly shown and described with reference to various preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. An optically-pumped fiber amplifier for suppressing stimulated Brillouin scattering (SBS) comprising
an optical signal source;
a section of fiber responsive to the optical signal source for amplifying an optical output signal therefrom, said section of fiber comprising at least two separate fiber segments disposed in series, each fiber segment formed to exhibit a different Brillouin center frequency, the Brillouin center frequencies being sufficiently different to prevent continuing Brillouin amplification in a backward-propagating Stokes signal passing from one fiber segment into an adjacent fiber segment of the fiber amplifier, reducing the total Stokes power generated in the fiber amplifier, wherein the at least two fiber segments comprise segments of different lengths disposed such that at least one fiber segment of shorter length is disposed at an output end of the optically-pumped fiber amplifier.

2. An optically-pumped fiber amplifier as defined in claim 1 wherein the at least two fiber segments comprise a plurality of N fiber segments, each fiber segment exhibiting a different Brillouin center frequency than the fiber segments adjacent thereto to prevent further amplification of the backward-propagating Stokes signal, reducing the total Stokes power generated in the fiber amplifier.

3. An optically-pumped fiber amplifier as defined in claim 1 wherein the different Brillouin center frequencies are induced by maintaining a core region each fiber segment at a different temperature.

4. An optically-pumped rare-earth doped fiber amplifier as defined in claim 1 wherein the Brillouin center frequency shift is induced by imparting a physical strain on the at least one fiber segment.

5. An optically-pumped rare-earth doped fiber amplifier as defined in claim 1 wherein the Brillouin center frequency shift is induced by modifying the composition of the at least one fiber segment.

6. An optically-pumped rare-earth doped fiber amplifier as defined in claim 1 wherein the Brillouin center frequency shift is induced by modifying the modal properties of the at least fiber segment.

7. An optically-pumped fiber amplifier as defined in claim 1 wherein the difference in Brillouin center frequency between adjacent fiber segments is greater than or equal to the Brillouin gain bandwidth of the fiber amplifier to prevent further amplification of the backward-propagating Stokes signal, reducing the total Stokes power generated in the fiber amplifier.

8. An optically-pumped fiber amplifier as defined in claim 2 wherein the plurality of N fiber segments comprises a total length L, with a breakpoint $\alpha_i$ is defined as an interface between adjacent fiber segments, where $$\alpha_i = \sqrt{\frac{i}{N}},$$

where $i=1,2,\ldots,N$ and the length $z_i$ of each segment is defined by $\alpha_i L$.

9. An optically-pumped fiber amplifier as defined in claim 8 wherein each fiber segment of the plurality of N fiber segments is maintained at a different temperature $T_i$ such that adjacent fiber segments exhibit a temperature difference $\Delta T=|T_i-T_{i-1}|$ is greater than the temperature-equivalent gain bandwidth.

10. An optically-pumped fiber amplifier as defined in claim 1 wherein the optical signal source comprises a pulsed signal source.

11. An optically-pumped fiber amplifier as defined in claim 1 wherein the optical signal source comprises a continuous wave signal source.

12. A method for suppressing Brillouin scattering in an optically pumped fiber amplifier comprising the steps of:
providing an optical signal source;
providing a section of optical fiber responsive to the optical signal source, the section of optical fiber comprising a plurality of separate fiber segments disposed in series, and
configuring each fiber segment to exhibit a different Brillouin center frequency, the Brillouin center frequencies being sufficiently different to prevent continuing Brillouin amplification in a backward-propagating Stokes signal passing from one fiber segment into an adjacent fiber segment of the fiber amplifier, reducing the total Stokes power generated in the fiber amplifier, wherein the plurality of fiber segments comprise segments of different lengths disposed such that at least one fiber segment of shorter length is located at an output end of the fiber amplifier.

13. The method as defined in claim 12 wherein the configuring step comprises:
maintaining a core region of each fiber segment at a different temperature, the different temperatures created different Brillouin center frequencies.

14. The method as defined in claim 12 wherein the method further comprises the step of determining an optimal arrangement of the plurality of fiber segments, wherein the determination step comprises the steps of:
dividing the fiber into N segments, where N is an integer; and
maintaining each segment at a predetermined temperature $T_j$, where j is an integer from 1 to N, and a temperature difference $\Delta T$, between adjacent segments, is at least greater than a temperature-equivalent gain-bandwidth.

* * * * *